Aug. 1, 1961  W. C. L. HEMEON  2,994,406
CLEANABLE GAS FILTER

Filed June 13, 1958  3 Sheets-Sheet 1

INVENTOR.
WESLEY C.L. HEMEON
BY
Brown, Critchlow, Flick + Peckham
ATTORNEYS.

Aug. 1, 1961  W. C. L. HEMEON  2,994,406
CLEANABLE GAS FILTER

Filed June 13, 1958  3 Sheets-Sheet 3

INVENTOR.
WESLEY C. L. HEMEON
BY
Brown, Critchlow, Flick & Peckham
ATTORNEYS.

United States Patent Office 2,994,406
Patented Aug. 1, 1961

2,994,406
CLEANABLE GAS FILTER
Wesley C. L. Hemeon, 5618 Northumberland,
Pittsburgh, Pa.
Filed June 13, 1958, Ser. No. 741,862
2 Claims. (Cl. 183—9)

This invention relates to apparatus for separating particulate matter from air or gas streams and collecting that matter on a filter material from which it can be periodically removed without removing the filter from the apparatus and with little or no interruption to the stream flow through the apparatus.

Air and gas filters in the form of loose fiber bats, such as glass fiber, have high dust holding capacity in relation to air flow and low pressure drop. However, dust and other particles are so tenaciously retained by the fibers of these filters that they are very difficult to clean or rejuvenate. As a result, filters of this type are commonly discarded after the accumulation of particulate matter is large enough to raise the pressure drop through the filter to a certain point; and the use of such filters is generally limited to air or gas streams having a low concentration of particulate matter, so that the filters will have a fairly long life before they are thrown away.

It is accordingly among the objects of the present invention to provide apparatus that will periodically remove particulate matter collected on loose fiber bat filters, without modifying the superior filtration characteristics of such filters; that will do this easily and simply; and that will do it without requiring the removal of the filter material from its enclosing apparatus and with little or no interruption to stream flow.

In accordance with this invention, the apparatus includes a housing provided with an inlet for gas to be filtered and an outlet for filtered gas. Rotatably supported inside this housing is an annular frame or rotor, which supports an annular bat of filter material of the loose fiber type. Sealing means are provided between the rotor and housing so that the filter will act as a stationary annular gas-permeable partition between the gas inlet and outlet. Means are provided for rotating the rotor and its supported filter during a cleaning cycle and for spraying a cleaning liquid on the filter while it is rotating.

A preferred embodiment of this invention is illustrated in the accompanying drawings in which FIG. 1 is a plan view of the apparatus, showing only the exterior thereof;

Figure 1:
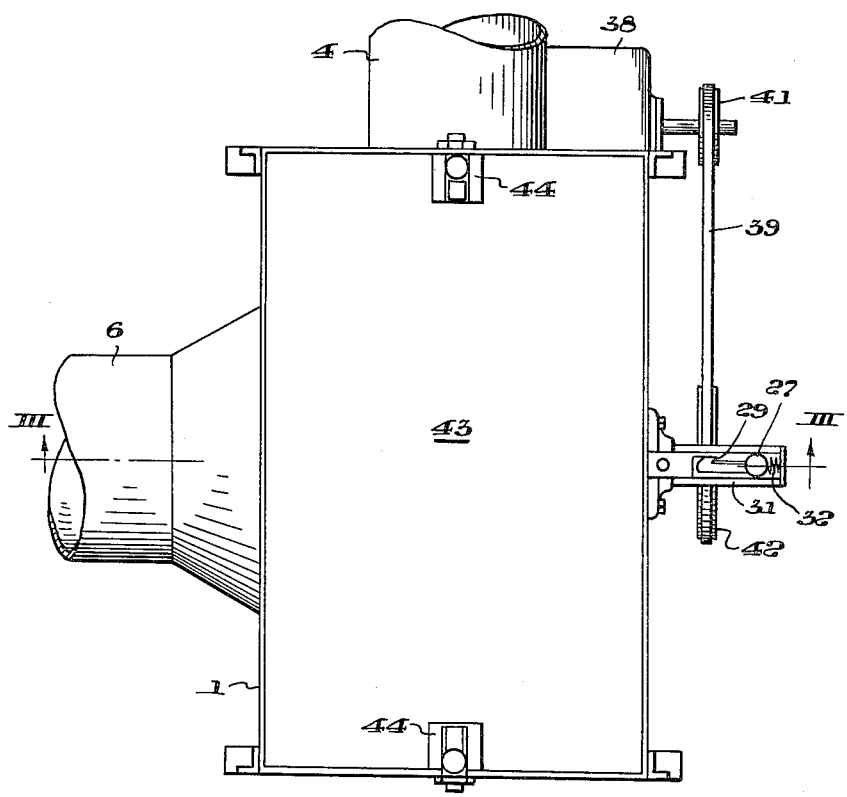
Figure 2:
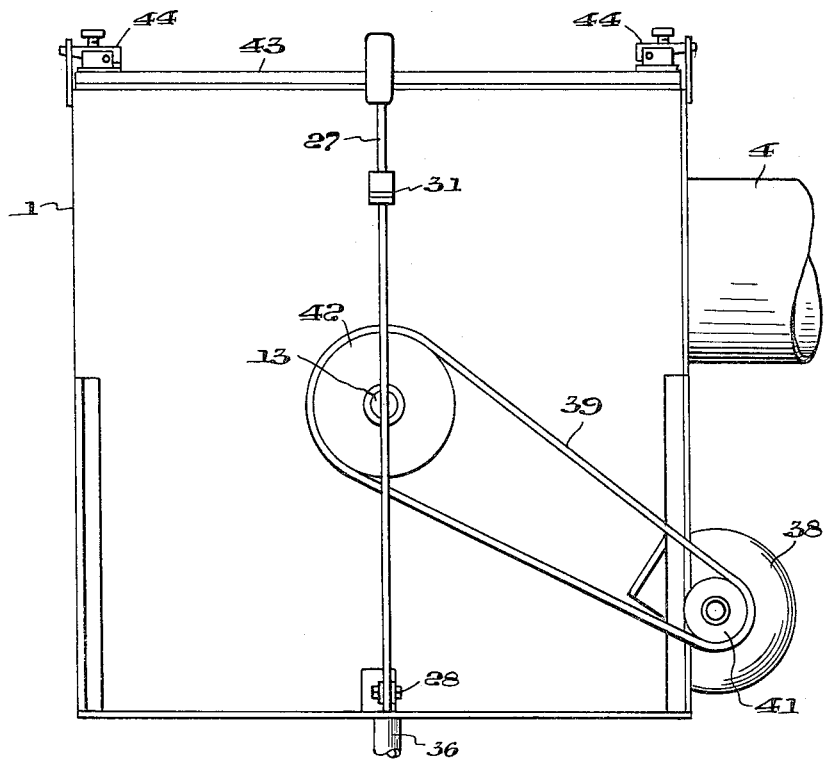
FIG. 2 is a side elevation of the apparatus in FIG. 1.

Referring to the drawings, a metal housing 1 is provided with a gas inlet 2 and a gas outlet 3, in the form of circular ports in adjacent side walls of the housing. The inlet is connected to a supply duct 4 for conducting to the housing a stream of gas to be filtered. The outlet, in turn, is connected to a delivery duct 6 for conducting filtered gas to a desired point or points of distribution. Fans, or other means, for moving the gas stream form no part of this invention and are not shown. Within the housing is rotatably mounted an annular frame or rotor 7, the peripheral surface of which is formed by a wire screen 8, or similarly perforated material, supported by circular channels 9 at either end of the rotor. The bottom edges of these channels are preferably connected, as by bars 11, and supported by a spider 12 secured to a rotatable shaft 13. This shaft is shown as substantially concentric with outlet 3 and extending normal to the housing wall 10 containing that outlet. One end of the shaft extends through a wall of the housing opposite the outlet port 3 and is supported in a bearing 14. The other end of this shaft is supported by another bearing 16, mounted on a bracket 17 extending across the outlet 3 and fastened to the adjacent housing wall. The right hand end of the rotor (in FIG. 3) is closed to the flow of gas by a closure plate 18, through which the shaft 13 extends with a gas-tight fit. The other end of the rotor is open. The rotor is large enough that its open end will circumscribe the gas outlet 3 opposed thereto.

Supported by the rotor between the wire screen 8 and rods 11 is a loose fiber bat 21 of filter material, such as glass fiber, the side edges of which fit inside the channels 9. For convenience in inserting the bat, the wire screen 8 may be made in two pieces joined by latches 19; and, if desired, a second wire screen 22 supported directly on the rods 11 may be used as a support for the inner surface of the filter bat.

Figure 3:
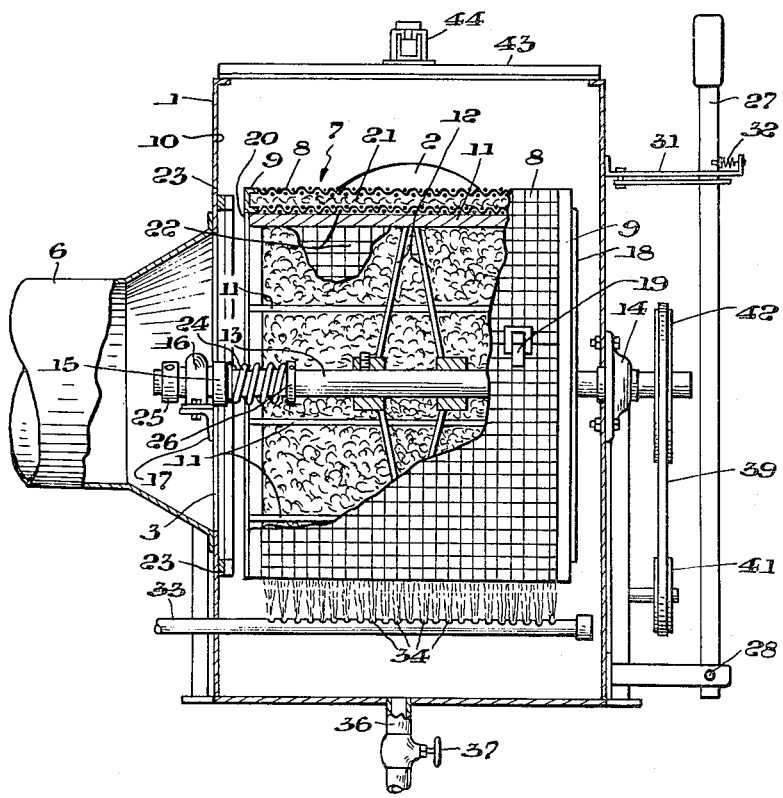
FIG. 3 is a front elevation of the apparatus, partly in section along the line III—III of FIG. 1.

A number of different means may be used to provide a sealing engagement between the rim 20 at the open end of the motor and the housing wall 10 around the outlet 3. For example, such sealing means may be of the shaft seal type that maintains a seal between relatively rotating parts, or it may be a detachable seal that may be broken when it is desired to rotate one of the parts relative to the other. One form of the latter type is shown in FIG. 3, in which shaft 13 is not only rotatably supported in its bearings 14 and 16, but also adapted to move axially therein, so that the open end of the rotor can be shifted to and from the wall 10 of the housing. A sealing gasket 23 is disposed on that wall around the outlet 3 for detachable sealing engagement with the outer rim 20 of the rotor. A spring 24, surrounding the shaft 13 and extending between a loose collar 15 and adjustable fixed collar 26, normally urges the shaft to the right out of engagement with gasket 23, the amount of axial movement being limited by a second fixed collar 25 on the end of the shaft. A lever 27 mounted outside of the housing on a pivot 28 is adapted to be moved manually or by suitable mechanical means, to press against the end of the shaft 13 to shift the rotor to the left and into sealing engagement with gasket 23. In this position, the filter 21 acts as a stationary gas permeable partition between the inlet 2 and the outlet 3, through which the gas stream must pass radially. Suitable locking means, such as a notch 29 (see FIG. 1) in bracket 31 permits the lever to be secured in its operative position during the filtering operation when the rotor is in stationary sealing engagement with the housing. The lever is unlatched and urged by a spring 32 into its inoperative position, as shown in the drawings, to disengage the rotor for rotation during the cleaning operation described below.

As an example of another type of detachable seal, and one that does not require any axial movement of the rotor, an inflatable tube may be secured to the housing wall 10 in place of gasket 23. When inflated the tube creates a gas tight seal between the rotor and the wall. When deflated, the seal is broken and the rotor becomes freely rotatable.

Below the rotor, or in one or more other convenient locations, and parallel to the shaft 13 is mounted a liquid spray pipe 33, which is connected to a source of liquid under pressure (not shown) and is provided with multiple outlets or nozzles 34. It has been found that water is a suitable cleaning liquid in most cases, but it will be understood that other liquid cleaning agents or solvents may be used, depending on the type of particulate matter that is collected by the filter and the use to which the filtered gas is put. At the bottom of the housing is a drain 36, provided with a valve 37 through which the cleaning fluid may be discharged. The shaft 13 is adapted to be rotated by an electric motor 38, through a belt 39 and pulleys 41 and 42, or by some other suitable means. The top 43 of the housing is removably secured by latches 44 for gaining access to the interior of the housing.

During the filtering operation, the rotor is locked in sealing engagement with the gasket 23, so that all gas entering the housing through inlet 2 must pass from the outside to the inside of the filter before reaching the outlet. When sufficient particulate matter has been collected on the filter, that is, when the pressure drop increases to a predetermined point, or if desired at periodic intervals, the filter is cleaned and rejuvenated by unlatching lever 27 to shift the rotor out of sealing engagement with the wall of the housing. The spray is then turned on, and the rotor rotated, while the cleaning liquid penetrates to the inner fibers of the filter under the pressure of the spray and is then discharged outward by centrifugal force and carries the dirt with it. When washing is completed, the spray is turned off and continued rotation of the rotor for a brief period expels the residual water retained between the fibers of the filter. It has been found that the washing and drying process occupies little time, during which the flow of gas through the apparatus may be allowed to continue or may be shut off, as desired. In other words, the flow of gas through the apparatus does not interfere with the cleaning operation.

It will be understood that additional or alternative sprays could be directed against the inside of the filter (for example, from a spray pipe supported in the outlet duct 6 and extending inside the rotor). It is also within the purview of this invention to provide said apparatus with automatic controls of various types that will initiate a cleaning cycle on the occurrence of a predetermined pressure differential between the gas inlet and outlet, continue that cycle for a predetermined time, and then initiate a filtering cycle, so that the operation of the apparatus will be fully automatic.

It is among the advantages of this invention that the filter need not be removed from the apparatus while it is being washed, that it is quickly dried after washing, and that there is little or no interruption in the flow of gas during the cleaning operation. In addition, the sealing means between rotor and housing is adapted to both the filtering and cleaning cycles. The useful life of the filter is increased immeasurably, and it can be used economically for filtering gas streams having a heavy concentration of dirt particles.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Cleanable gas filter apparatus comprising a housing provided with an inlet for the gas to be filtered and an outlet for the filtered gas, an annular rotor mounted for intermittent rotation inside the housing with one end thereof in detachable gas-sealing engagement with the housing around the gas outlet during filtering cycles in which the rotor is stationary and with the other end thereof closed to gas flow, means for breaking the sealing engagement between the rotor and housing for freeing the rotor for rotation between filtering cycles, an annular bat of fine fibrous filter material supported by the rotor for radial flow of gas therethrough during filtering cycles, said filter material having the characteristic that when drenched with water a substantial portion of the water will not drain therefrom by gravity but will be retained between the fibers of the material, spray means located externally of the rotor and operative between filtering cycles for subjecting the filter material to a drenching spray of water that will penetrate to the radially innermost portions of the filter material, and means operative during and after the operation of the spray means for rapidly rotating the rotor between filtering cycles, whereby water forced into the filter material by the spray means will be quickly thrown outward by centrifugal force along with the dirt accumulated during the preceding filtering cycle.

2. Cleanable gas filter apparatus comprising a housing provided with an inlet for the gas to be filtered and an outlet for the filtered gas, an annular rotor mounted for intermittent rotation inside the housing with one end thereof normally in gas-sealing engagement with the housing around the gas outlet and with the other end thereof closed to gas flow, a rotatable shaft supporting the rotor, bearings mounted on the housing for slidably and rotatably supporting the shaft, spring means urging the rotor axially in one direction into a first position and manually operable means for shifting the rotor axially in the opposite direction against the urging of the spring into a second position, the rotor in one of said positions being in gas-sealing engagement with the housing around the gas outlet and in the other of said positions being disengaged from the housing and free to rotate, an annular bat of fine fibrous filter material supported by the rotor for radial flow of gas therethrough during a filtering cycle in which the rotor is stationary, said filter material having the characteristic that when drenched with water a substantial portion of the water will not drain therefrom by gravity but will be retained between the fibers of the material, spray means located externally of the rotor and operative between filtering cycles for subjecting the filter material to a drenching spray of water that will penetrate to the radially innermost portions of the filter material, and means operative during and after the operation of the spray means for rapidly rotating the rotor between filtering cycles, whereby water forced into the filter material by the spray means will be quickly thrown outward by centrifugal force along with the dirt accumulated during the preceding filtering cycle.

References Cited in the file of this patent

UNITED STATES PATENTS

| | | |
|---|---|---|
| 1,273,791 | Knowles | July 23, 1918 |
| 1,690,813 | Birkholz | Nov. 6, 1928 |
| 1,765,720 | Goodloe | June 24, 1930 |
| 1,962,425 | Carlson | June 12, 1934 |
| 2,197,004 | Myers | Apr. 16, 1940 |
| 2,657,802 | Reed | Nov. 3, 1953 |

FOREIGN PATENTS

| | | |
|---|---|---|
| 386,094 | Great Britain | Jan. 12, 1933 |
| 378,679 | Italy | Feb. 21, 1940 |
| 505,047 | Italy | Apr. 13, 1953 |
| 130,295 | Sweden | Oct. 5, 1950 |